(12) United States Patent
Wen

(10) Patent No.: US 7,972,039 B2
(45) Date of Patent: Jul. 5, 2011

(54) LIGHT GUIDING DIFFUSER

(75) Inventor: Fong-Yuan Wen, Taoyuan (TW)

(73) Assignees: Gem-Sun Technologies Co., Ltd (TW); Stonlite Discrete & Opto Co., Ltd, JinJiang, Fujian (CN)

( * ) Notice: Subject to any disclaimer, the term of this patent is extended or adjusted under 35 U.S.C. 154(b) by 318 days.

(21) Appl. No.: 12/434,801

(22) Filed: May 4, 2009

(65) Prior Publication Data

US 2010/0277926 A1  Nov. 4, 2010

(51) Int. Cl.
*F21V 8/00* (2006.01)

(52) U.S. Cl. ......... 362/311.02; 362/311.06; 362/311.08; 362/311.1; 362/326; 362/335

(58) Field of Classification Search ............. 362/311.02, 362/311.06, 311.08, 311.1, 326, 335; 359/707
See application file for complete search history.

(56) References Cited

U.S. PATENT DOCUMENTS

| | | | | |
|---|---|---|---|---|
| 7,422,347 B2 * | 9/2008 | Miyairi et al. | ................ | 362/335 |
| 7,649,697 B2 * | 1/2010 | Yoon et al. | ................... | 359/708 |
| 7,780,313 B2 * | 8/2010 | Lam et al. | ................ | 362/249.02 |

* cited by examiner

*Primary Examiner* — Stephen F Husar
*Assistant Examiner* — James W Cranson
(74) *Attorney, Agent, or Firm* — Chun-Ming Shih; HDLS IPR Services

(57) ABSTRACT

A light guiding diffuser used for assembling with a light emitting diode module to form an illuminating light source. The light guiding diffuser includes an elliptical ring-shaped base portion and a convex portion extended from a surface of the base portion and formed a space with the base portion for accommodating the light emitting diode module. The convex portion has a cross section which has a minimum thickness in a center thereof and the thickness of the cross section continuous increases from the center toward the base portion.

6 Claims, 7 Drawing Sheets

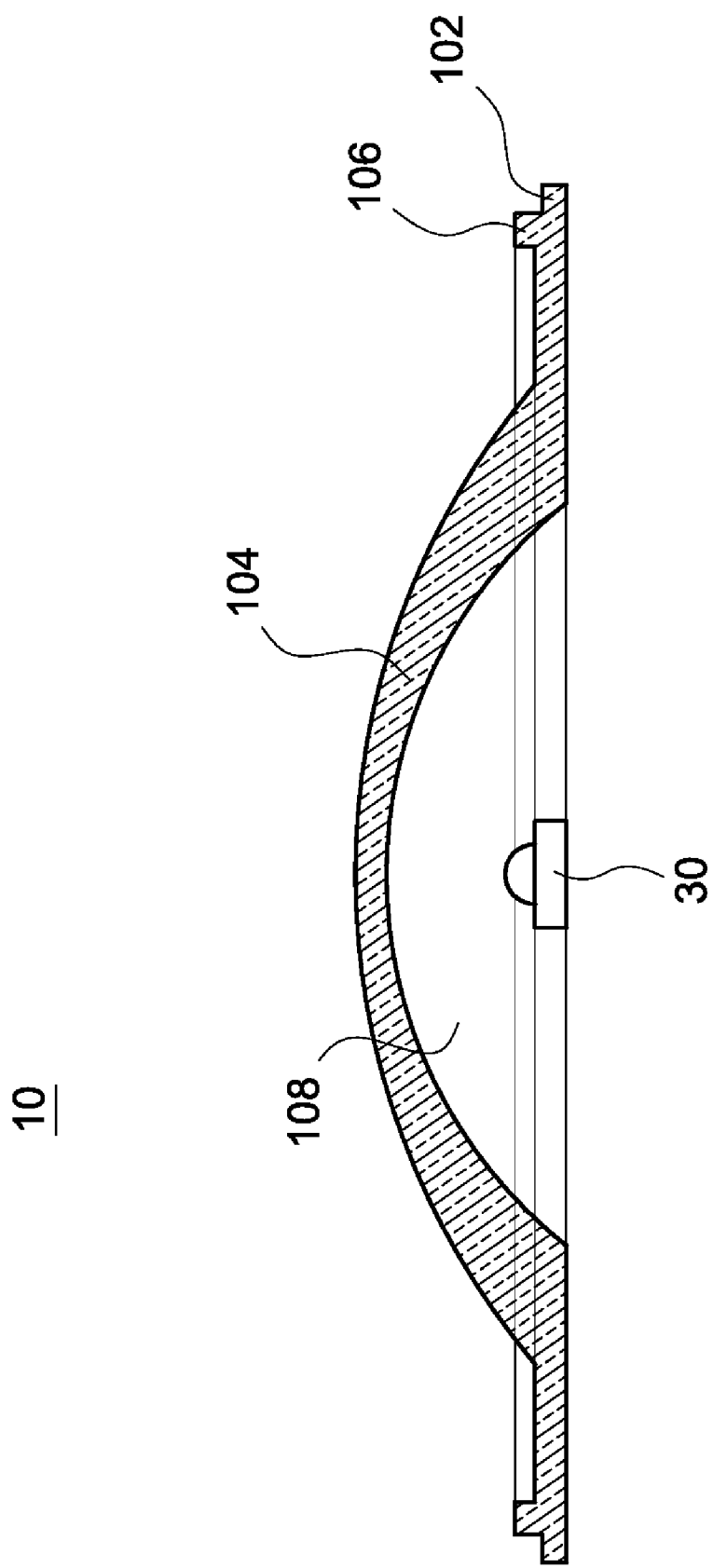

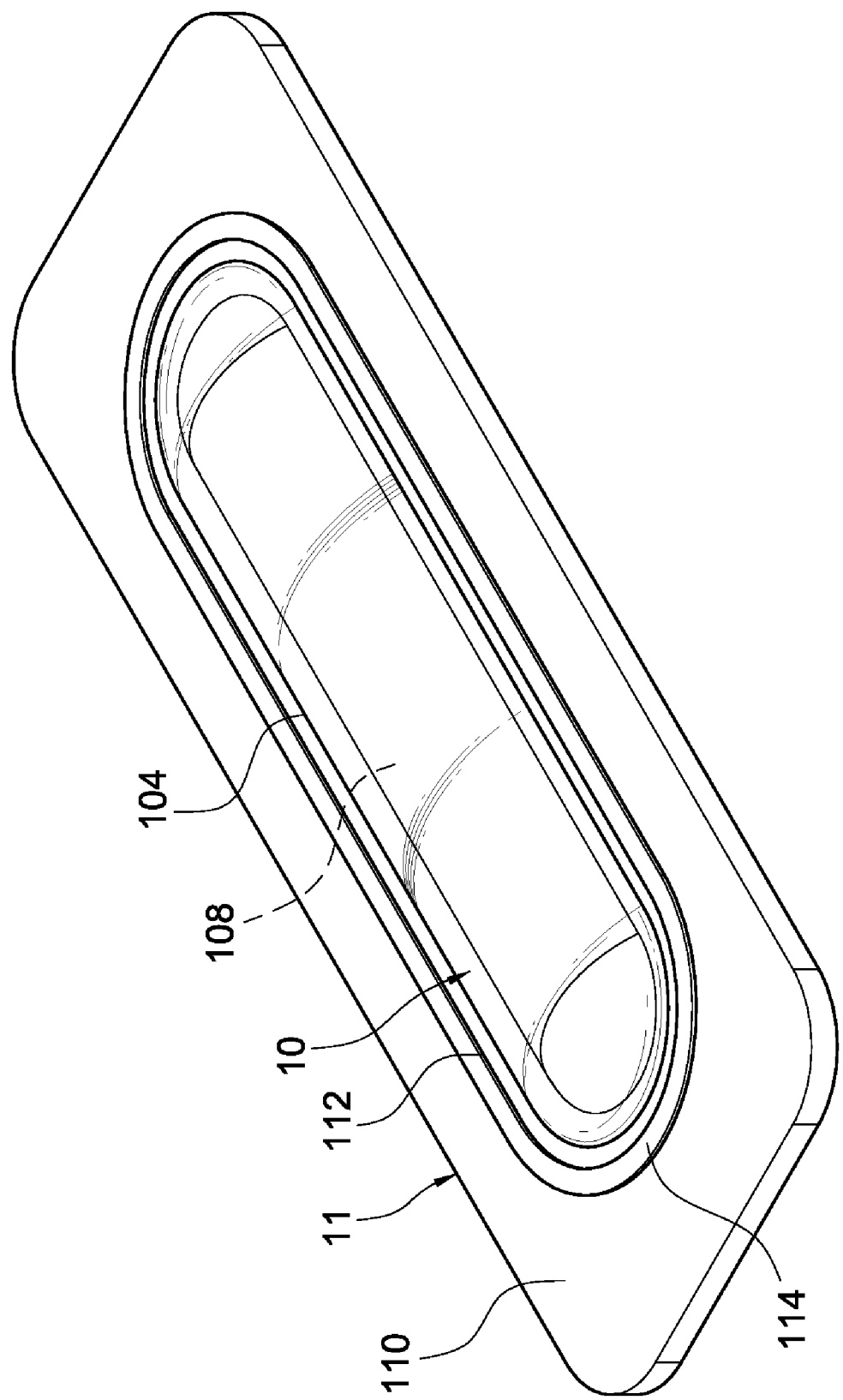

LIGHT GUIDING DIFFUSER

BACKGROUND OF THE INVENTION

1. Field of the Invention

The present invention relates to an optical element, in particular to a light guiding diffuser.

2. Description of Related Art

The rapid development of the efficiency of the light emitting diode leads to more and more general lighting applications. Besides, light emitting diode has advantages of energy saving, compact size and light weight which make the light emitting diode popular in various fields of illuminating such as indoor or outdoor illuminating and lighting of mobile electronics.

Since the brightness provided by single light emitting diode is usually not enough for most applications, it is necessary to put a plurality of light emitting diodes together in a module to provide appropriate brightness for a specific application. However, the light emitted by each light emitting diode has a limited divergence angle. That means that when the light of the module is projected on the ground or table, it concentrates on a specific area and thus a uniform illumination can not be obtain.

In order to solve the abovementioned issue, an additional optical diffuser is often adopted to expand the divergence angle of the light emitting diode. Such an optical diffuser is also called a secondary lens, which is positioned over the packaged light emitting diode to expand the divergence angle so as to obtain a more uniform illumination. However, the conventional optical diffuser still can not provide a uniform illumination like the illumination provided by a fluorescent lamp.

SUMMARY OF THE INVENTION

The object of the present invention is to provide a light guiding diffuser, capable of greatly expanding the divergence angle of the light beam emitted by the light emitting diode module.

In order to achieve aforementioned purpose, the present invention provides a light guiding diffuser, which is used for assembling with a light emitting diode module to form an illuminating light source. The light guiding diffuser includes an elliptical ring-shaped base portion and a convex portion extended from a surface of the base portion and formed a space with the base portion for accommodating the light emitting diode module. The convex portion has a cross section which has a minimum thickness in a center thereof and the thickness of the cross section continuous increases from the center toward the base portion.

BRIEF DESCRIPTION OF THE DRAWINGS

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

FIG. 3 is a schematic view presenting the light guiding diffuser worked with a light emitting diode module;

FIG. 4 is a schematic view presenting the light guiding diffuser with a cover plate;

DETAILED DESCRIPTION OF THE INVENTION

A detailed description of the present invention will be made with reference to the accompanying drawings.

Figure 1:
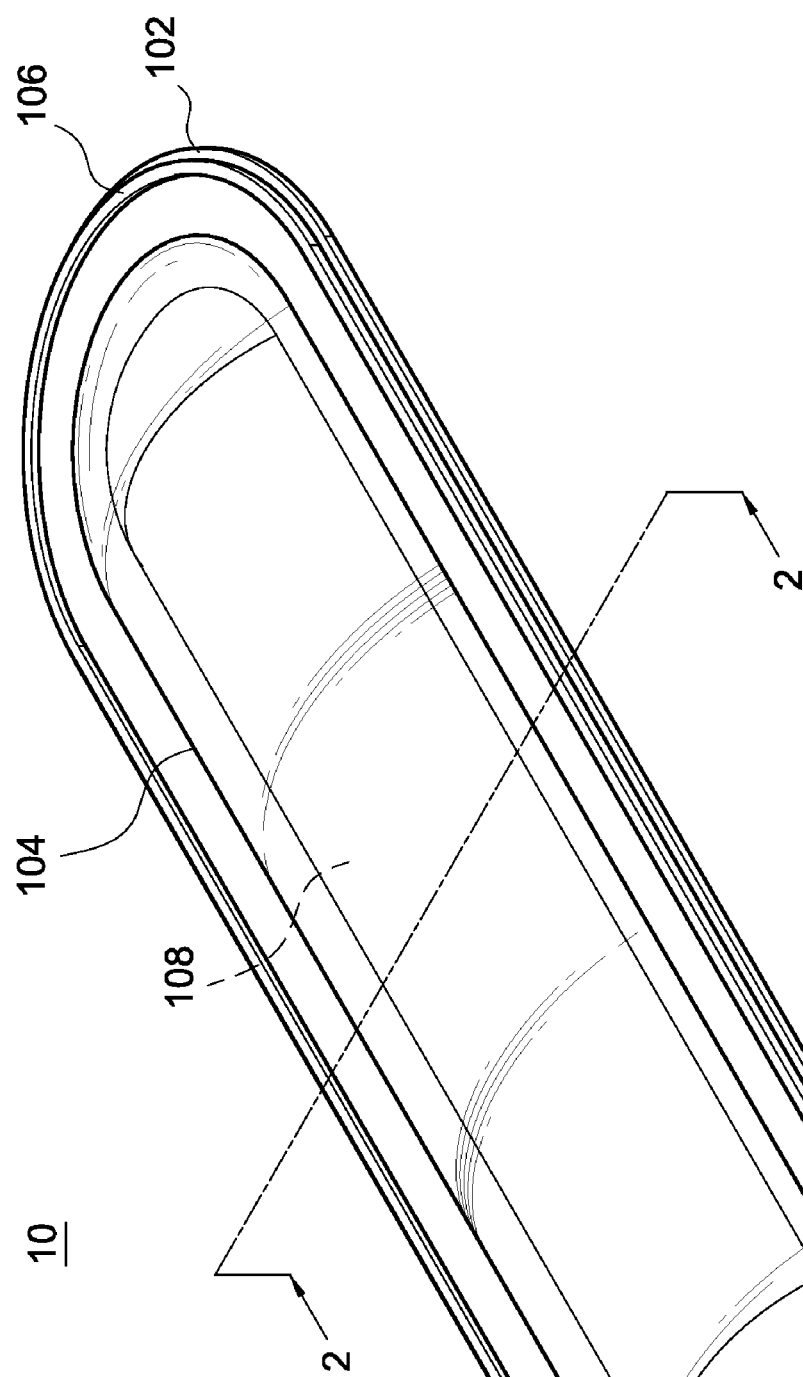
FIG. 1 is a schematic view presenting a light guiding diffuser according to a first embodiment of the present invention.
Figure 2:
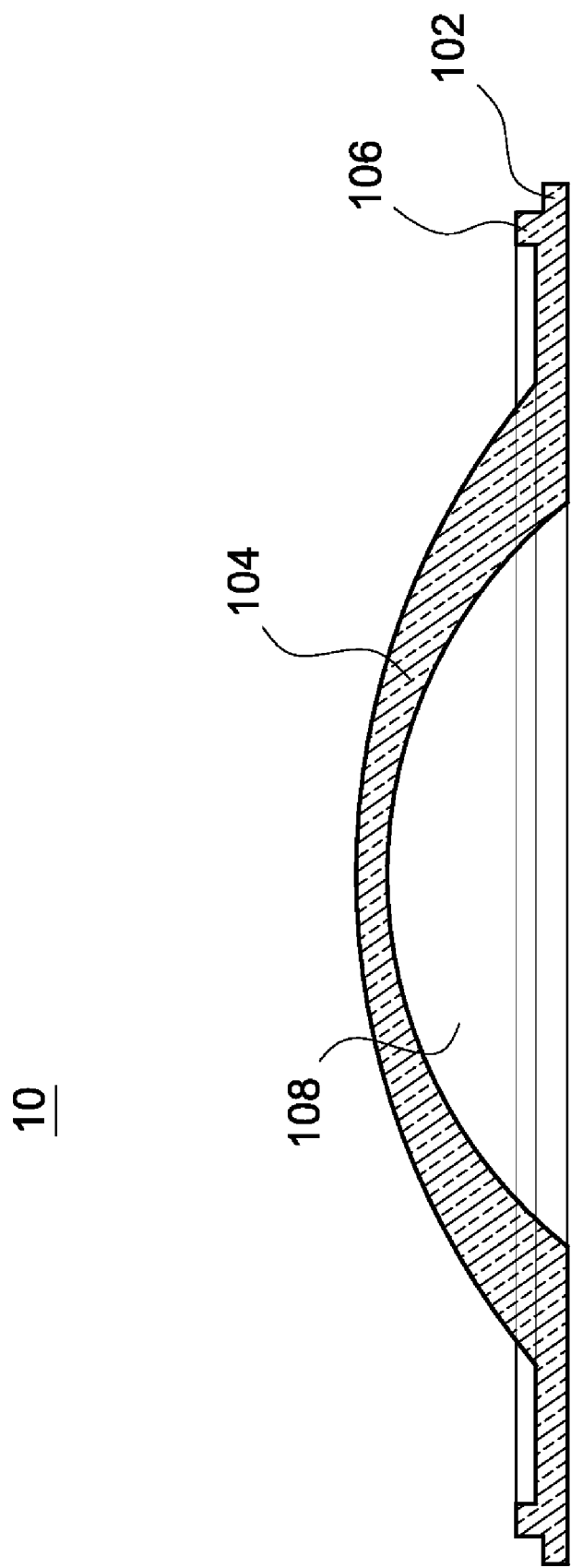
FIG. 2 is a cross section view presenting the light guiding diffuser according to the first embodiment of the present invention.

FIG. 1 and FIG. 2 are respectively a schematic view and a cross section view of a light guiding diffuser 10 according to a first embodiment of the present invention. The light guiding diffuser 10 is used for assembling with a light emitting diode module 30 (see FIG. 3) to form an illuminating light source. The light guiding diffuser 10 includes an elliptical ring-shaped base portion 102 and an elliptical shaped convex portion 104 extended from a surface of the base portion 102. In this embodiment, the base portion 102 and the convex portion 104 are made in one piece form. A space 108 is formed by the base portion 102 and the convex portion 104 for accommodating the light emitting diode module 30.

The convex portion 104 has arc-shaped cross section. As FIG. 2 and FIG. 3 show, the thickness of the convex portion 104 is not a constant. The cross section of the convex portion 104 has a minimum thickness in a center thereof. And the thickness of the cross section continuous increases from the center toward the base portion 102.

When a light beam in the space 108 radiates toward the protrusion portion 104, the light beam is refracted by the protrusion portion 104. Since the thickness of the convex portion 104 is not a constant, the refracted angles of the light beam on everywhere of the convex portion 104 are not the same. The refracted angle of the light beam is smaller in the thinner place, and the refracted angle of the light beam is larger in the thicker place. In other word, the protrusion portion 104 works like a negative lens. In addition, a ring-shaped protrusion 106 is further formed on the base portion 102.

In an embodiment of the present invention, as FIG. 4 shows, a cover plate 11 is used for assembled with the light guiding diffuser 10 to form a light diffuser module. The cover plate 11 is used for protecting the light guiding diffuser 10 and making the light guiding diffuser 10 easier to assemble with a light source.

The cover plate 11 is of square shape with round corners. The cover plate 11 has an elliptical opening 112 in the center thereof. The convex portion 104 extends from the base portion 102 and protrudes through the opening 112. Besides, a ring-shaped edge 114 with thicker thickness is formed on the top surface of the cover plate 11. A ring-shaped groove (not shown) is formed on the bottom surface of the cover plate 11. The protrusion 106 on the base portion 102 extends into the groove to firmly connect the light guiding diffuser 10 with the cover plate 11.

Figure 5B:
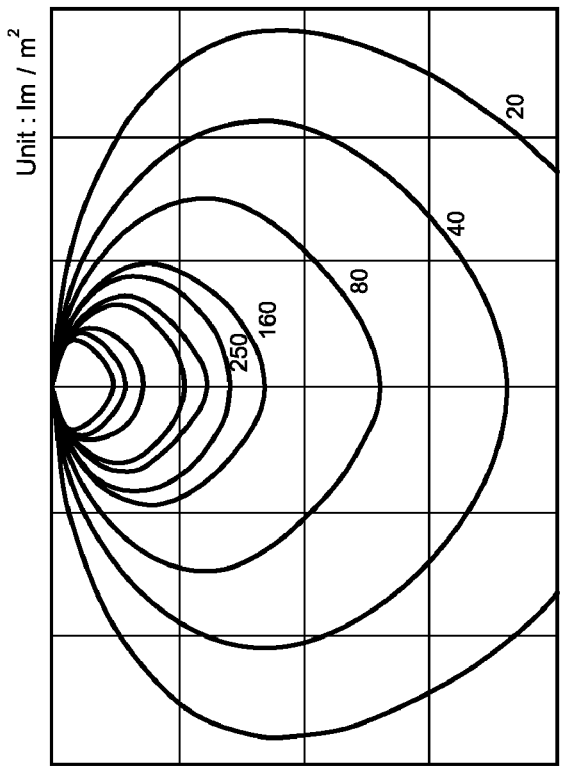
FIG. 5B shows intensity distribution along a lateral direction of the light guiding diffuser when suffering a light beam.
Figure 5A:
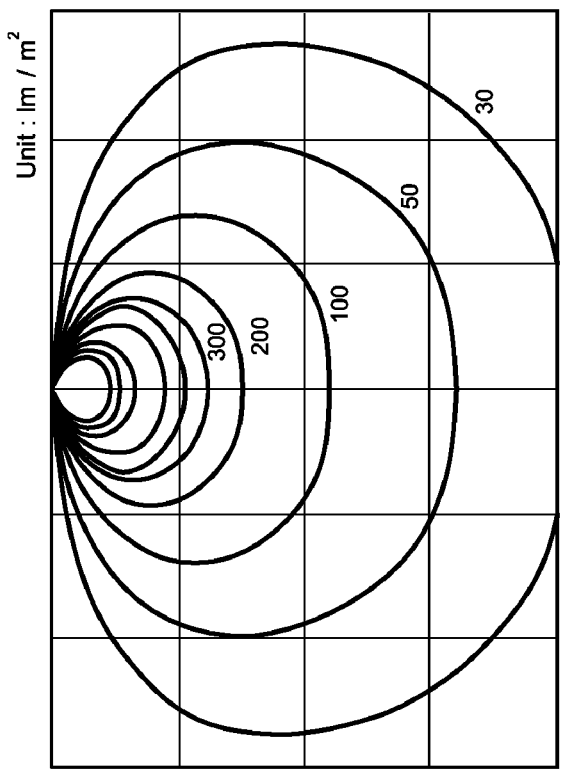
FIG. 5A shows intensity distribution along a longitudinal direction of the light guiding diffuser when suffering a light beam.

FIG. 5A and FIG. 5B respectively show intensity distribution along a longitudinal direction and a lateral direction of the light guiding diffuser 10 when suffering a light beam emitted by a light emitting diode module placed in the space 108. Those closed loop lines are so called equiluminous curves. As FIG. 5A and FIG. 5B show, the divergence angle of the light beam emitted by the light emitting diode module 10 is greatly expanded by the light guiding diffuser and is even approximate to 180 degree.

Figure 6:
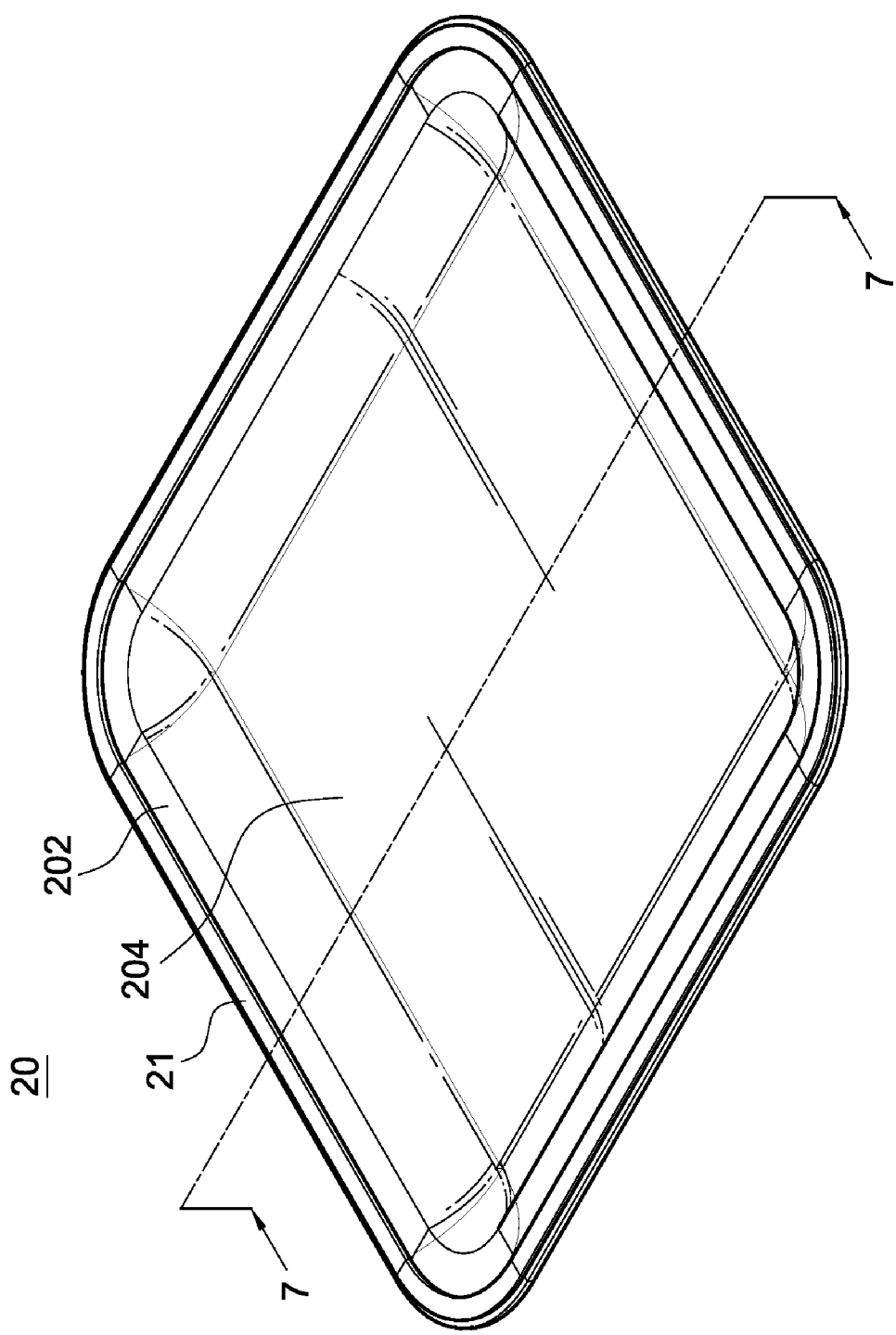
FIG. 6 is a schematic view presenting a light guiding diffuser according to a second embodiment of the present invention.
Figure 7:
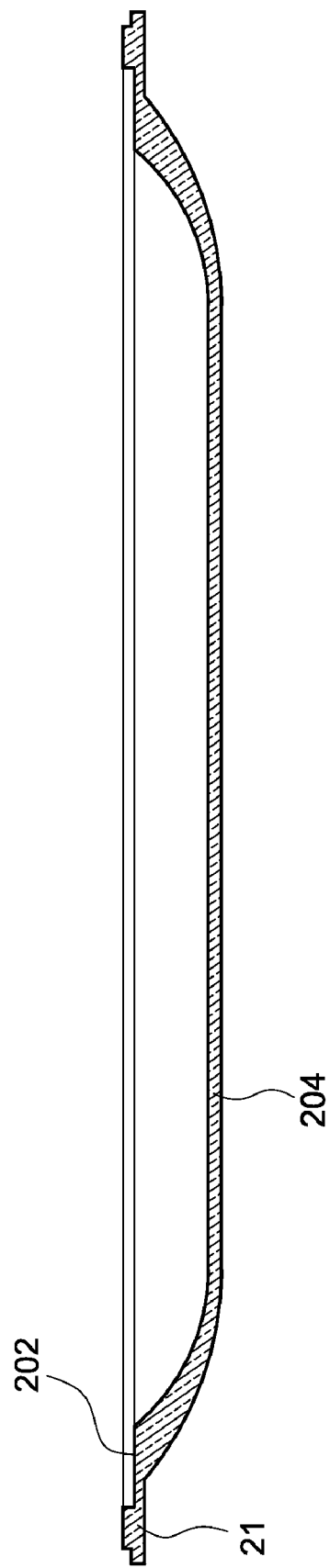
FIG. 7 is a cross section view presenting the light guiding diffuser according to the second embodiment of the present invention.

FIG. 6 and FIG. 7 are respectively a schematic view and a cross section view of a light guiding diffuser 20 according to a second embodiment of the present invention. The light guiding diffuser 20 is similar to the light guiding diffuser of the first embodiment, and the difference is that the base portion 202, the convex portion 204 and the cover plate 21 are of square shape with round corners.

As a result, the divergence angle of the light beam emitted by the light emitting diode module can be greatly expanded by the light guiding diffuser of the present invention. And the divergence angle is even approximate to 180 degree. In indoor application, the light emitting diode module with the light guiding diffuser of the present invention can provide a uniform illumination like the illumination provided by a fluorescent lamp. In outdoor application, for example, the light emitting diode street lamp with the light guiding diffuser of the present invention can provide a uniform illumination and expanded illuminating area. Therefore, car drivers can get a clearer sight of the street that makes driving safer.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A light guiding diffuser, for assembling with a light emitting diode module to form an illuminating light source, the light guiding diffuser comprising:
    an elliptical ring-shaped base portion, and
    a convex portion extended from a surface of the base portion and formed a space with the base portion for accommodating the light emitting diode module,
    wherein the convex portion has a cross section which has a minimum thickness in a center thereof, and the thickness of cross section continuous increases from center toward the base portion.

2. The light guiding diffuser according to claim 1, wherein the convex portion is of elliptical shape or square shape with round corners.

3. The light guiding diffuser according to claim 2, wherein the base portion and the convex portion are of one piece form.

4. A light diffuser module, for assembling with a light emitting diode module to form an illuminating light source, the light diffuser module comprising:
    a cover plate having an opening;
    a light guiding diffuser comprising an elliptical ring-shaped base portion arranged in a side of the cover plate, and a convex portion extended from a surface of the base portion and protruded through the opening, the convex portion forming a space with the base portion for accommodating the light emitting diode module, wherein the convex portion has a cross section which has a minimum thickness in a center thereof, and the thickness of the cross section continuous increases from the center toward the base portion.

5. The light diffuser module according to claim 4, wherein the convex portion is of elliptical shape or square shape with round corners.

6. The light diffuser module according to claim 4, wherein the base portion and the convex portion are of one piece form.

* * * * *